United States Patent
Schenk

(10) Patent No.: US 7,660,921 B2
(45) Date of Patent: Feb. 9, 2010

(54) TWO PORT USB DIGITAL STORAGE DEVICE

(76) Inventor: Brendan Keith Schenk, 14 Long Reach Road, Dorchester Heights, East London (ZA) 5241

( * ) Notice: Subject to any disclaimer, the term of this patent is extended or adjusted under 35 U.S.C. 154(b) by 127 days.

(21) Appl. No.: 11/928,385

(22) Filed: Oct. 30, 2007

(65) Prior Publication Data
US 2008/0198544 A1 Aug. 21, 2008

Related U.S. Application Data

(60) Provisional application No. 60/890,883, filed on Feb. 21, 2007.

(51) Int. Cl.
*G06F 9/02* (2006.01)

(52) U.S. Cl. .............. 710/62; 710/33; 710/74; 710/72; 711/115

(58) Field of Classification Search .......... 348/207, 348/231, 373; 386/46; 710/313, 316, 72, 710/74; 711/115; 714/6; 715/723
See application file for complete search history.

(56) References Cited

U.S. PATENT DOCUMENTS

| | | | |
|---|---|---|---|
| 6,385,677 B1 | 5/2002 | Yao | |
| 6,394,813 B1 | 5/2002 | Stout et al. | |
| 6,429,896 B1 * | 8/2002 | Aruga et al. | 348/231.99 |
| 6,676,420 B1 | 1/2004 | Liu et al. | |
| 6,733,329 B2 | 5/2004 | Yang | |
| 6,753,903 B1 | 6/2004 | Lin | |
| 6,908,038 B1 | 6/2005 | Le | |
| 6,991,467 B1 | 1/2006 | Cheng et al. | |
| 6,991,483 B1 | 1/2006 | Milan et al. | |
| 6,993,618 B2 | 1/2006 | Chen et al. | |
| 7,121,850 B2 * | 10/2006 | Yeh | 439/131 |
| 7,125,265 B2 | 10/2006 | Weng | |
| 7,511,233 B2 * | 3/2009 | Pocrass | 174/541 |
| 2004/0019742 A1 * | 1/2004 | Wei et al. | 711/115 |
| 2004/0088456 A1 * | 5/2004 | Zhang | 710/74 |
| 2005/0157187 A1 * | 7/2005 | Bin | 348/231.7 |
| 2005/0170699 A1 * | 8/2005 | Overtoom | 439/639 |
| 2005/0177661 A1 * | 8/2005 | Loo | 710/72 |
| 2006/0019532 A1 * | 1/2006 | Kiss, Jr. | 439/505 |
| 2006/0136623 A1 | 6/2006 | Elazar et al. | |
| 2006/0149895 A1 * | 7/2006 | Pocrass | 711/103 |
| 2006/0192004 A1 | 8/2006 | Elazar et al. | |
| 2006/0230202 A1 | 10/2006 | Lee | |
| 2006/0294272 A1 | 12/2006 | Chou et al. | |
| 2007/0065119 A1 | 3/2007 | Pomerantz | |
| 2008/0052439 A1 * | 2/2008 | Young et al. | 710/305 |
| 2009/0019224 A1 * | 1/2009 | Pocrass | 711/115 |
| 2009/0042433 A1 * | 2/2009 | Bushby | 439/352 |

OTHER PUBLICATIONS

USB, Universal Serial Bus Specification, 2000, USB, p. 77.*
Sony, Digital Still Camera, 2003, Sony, pp. 9 and 15.*

* cited by examiner

*Primary Examiner*—Henry W. H. Tsai
*Assistant Examiner*—Cheng-Yuan Tseng
(74) *Attorney, Agent, or Firm*—Christopher & Weisberg, P.A.

(57) ABSTRACT

The present invention provides a portable electronic storage device able to receive, store, and transmit or otherwise convey digital data and images from one electronic device to another. The storage device may generally include a housing containing one or more electronic components, and a plurality of connectors extending from the housing, the connectors being engageable with secondary electronic devices for the transfer of data and/or images. The electronic storage device may further include a software program operable via the secondary electronic devices for the manipulation of data and/or images.

4 Claims, 9 Drawing Sheets

TWO PORT USB DIGITAL STORAGE DEVICE

CROSS-REFERENCE TO RELATED APPLICATION

This application is related to and claims priority to U.S. Provisional Patent Application Ser. No. 60/890,883, filed Feb. 21, 2007 entitled Two Port "Duo" USB Digital Storage Traveling Device", the entirety of which is incorporated herein by reference.

STATEMENT REGARDING FEDERALLY SPONSORED RESEARCH OR DEVELOPMENT

N/A

FIELD OF THE INVENTION

The present invention relates to a method and system for the transfer and storage of digital data and images, and more particularly, towards a portable electronic storage device compatible with a digital camera and a computer.

BACKGROUND OF THE INVENTION

In recent years, digital cameras have rapidly grown in worldwide popularity. Digital cameras provide many advantages over conventional film cameras. For example, digital cameras do not require the added cost of rolls of film and the subsequent time needed for film development associated with conventional cameras. Digital cameras further often include a display such as an LCD screen or the like advantageously providing a photographer with an enhanced ability to frame and otherwise preview desired images, and to also immediately review pictures just taken. In addition, digital cameras are also able to directly interface with and provide data to be used in conjunction with a wide range of sophisticated computer graphics processing packages not typically available for conventional film cameras.

Digital cameras, however, are not without their disadvantages. Conventional high resolution digital cameras can be very costly and employ expensive memory media which may be capable of only capturing a relatively limited number of pictures. While storage capacity of memory modules or media is constantly increasing, these memory modules become increasingly expensive as the storage capacity increases. Moreover, even with a high storage capacity, due to the ability of modern digital cameras to capture images at higher resolutions, the resulting image files also expand in size and thus reduce the number of pictures that can be stored on a particular memory module. Of course, digital images stored on a digital camera, whether on removable media modules or directly on a permanent storage drive on the camera itself, may be transferred to a larger, more accessible storage medium, such as a hard disk or the like on a personal computer or laptop. Typically, photographers with digital cameras having captured and stored digital images on flash memory cards transfer the images to a large capacity hard disk or other storage medium to consolidate, organize and/or "permanently" store the images for subsequent printing or the like. Once the desired transfer has been completed, the camera media module or memory can be cleared and reused.

While the transfer of images from the memory of a digital camera to a computer may be convenient for some, many individuals either do not have a personal computer or a laptop, or alternatively, may be traveling for an extended period of time without access to a large storage device such as a computer. As a result, a photographer may face the increased cost of purchasing numerous expensive media modules to ensure available storage capacity sufficient to record memorable events over an extended period of time.

In view of the above drawbacks, it would be desirable to provide a convenient, portable, cost-effective electronic storage device able to easily interface with a digital camera for the transfer and storage of large amounts of data and/or digital images, thereby eliminating the need for access to large, bulky devices such as a laptop or personal computer for an extended period of time. It would further be desirable to provide an electronic storage device that is also readily usable with a laptop or computer for the transfer of data and/or digital images from the storage device without the need for specialized adapters, cords or the like.

SUMMARY OF THE INVENTION

The present invention provides a portable electronic storage device having a housing defining a first end and a second end, a first connector at the first end of the housing, and a second connector at the second end of the housing. The device may further include an electronic memory component disposed within the housing, and a controller disposed within the housing, where the controller is electrically coupled to the first connector, second connector, and electronic memory component. The first and second connectors may be USB connectors, for example, the first connector may include a mini-type USB connector and the second connector may include a type-A USB connector. The first and second connectors may be male connectors. In addition, the memory component may include a computer software program capable of performing the function of transferring data from an electronic device to the memory component. The program may include the capability of identifying at least one of a type, manufacturer, and model of the electronic device, and may further be capable of organizing data stored on the memory component, deleting data stored on the memory component, setting one or more settings for operation, including at least one of date, time, and language. Further, the electronic device may be a camera, and the computer program may be operable via an input mechanism located on the camera.

In accordance with the present invention, a portable electronic storage device may include a housing defining a first end and a second end, a male mini-type USB connector at the first end of the housing, a male type-A USB connector at the second end of the housing, an electronic memory component disposed within the housing, and a controller disposed within the housing, where the controller is electrically coupled to the connectors and electronic memory component. Further, the memory component can include a computer software program capable of performing the function of transferring data from a secondary electronic device to the memory component. The program may be capable of identifying at least one of a type, manufacturer, and model of the electronic device, organizing data stored on the memory component, deleting data stored on the memory component, and setting one or more settings for operation, including at least one of date, time, and language. In addition, the electronic device may include a camera and the computer program may be operable via an input mechanism located on the camera.

The present invention also provides a method for transferring data, including the steps of providing a digital camera having a visual display, an input mechanism and one or more images stored on an electronic storage media therein; electrically coupling a portable electronic storage device to the digital camera, where the portable electronic storage device includes a first connector, a second connector, and a memory component operably coupled to the first and second connectors; the memory component having a computer software program stored therein; and operating the software program via the input mechanism of the camera to transfer one or more images from the electronic storage media to the memory component of the portable electronic storage device. The method may further include the step of electrically coupling the portable electronic storage device to a secondary electronic device, and transferring one or more images stored on the memory component to the secondary electronic device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention provides a portable electronic storage device 10, generally designated as "10," able to receive, store, and transmit or otherwise convey digital data and images from one electronic device to another. The storage device 10 may generally include a housing 12 containing one or more electronic components, as described in more detail below. A plurality of connectors may extend from the housing 12, where the connectors are engageable with secondary electronic devices for the transfer of data and/or images.

Figure 1:
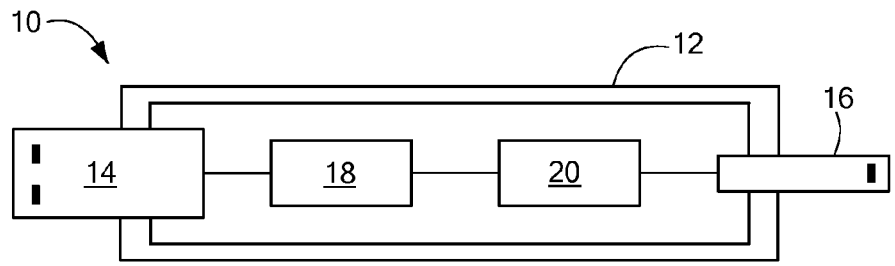
FIG. 1 is an illustration of an embodiment of an electronic storage device in accordance with the present invention.
Figure 2:
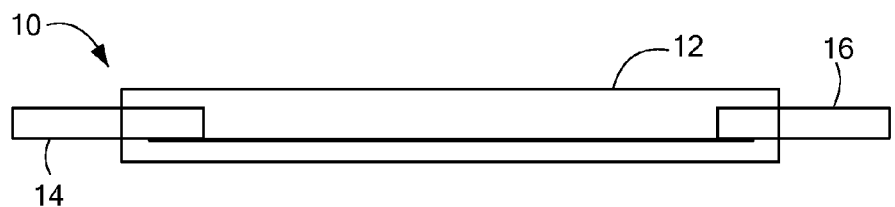
FIG. 2 is an additional illustration of an embodiment of an electronic storage device in accordance with the present invention.

Now referring to FIGS. 1-2, in particular, the housing 12 may be sized for ease of portability, and may be sized to easily fit in a pocket of a photographer or digital camera case. The housing 12 may include a stylized or contoured surface to enhance the appearance and/or ease of handling the device. A first connector 14 may be disposed at a first end of the housing 12, while a second connector 16 may be disposed at a second end of the housing 12 opposite the first end. The first and second connectors may be of different types and/or dimensions. For example, either of the first and second connectors may include, but is not limited to, a Universal Serial Bus ("USB") type-A connector, USB type-B connector, a 4-pin mini USB connector and/or a 5-pin mini USB connector, or a micro USB connector. Moreover, both the first and second connectors may be "male" connectors engageable with a similar type "female" connector on a secondary electronic device. The electronic storage device 10 of the present invention may also include a controller 18 disposed within the housing 12 and coupled to the first and second connectors, and a memory component 20 electronically coupled to the controller. The memory component 20 may include numerous types of electronic memory, including but not limited to a computer readable storage medium such as electrically-erasable programmable read only memory (EEPROM), non-volatile random access memory (NVRAM), synchronous dynamic random access memory (SDRAM), or a combination thereof.

Figure 3:
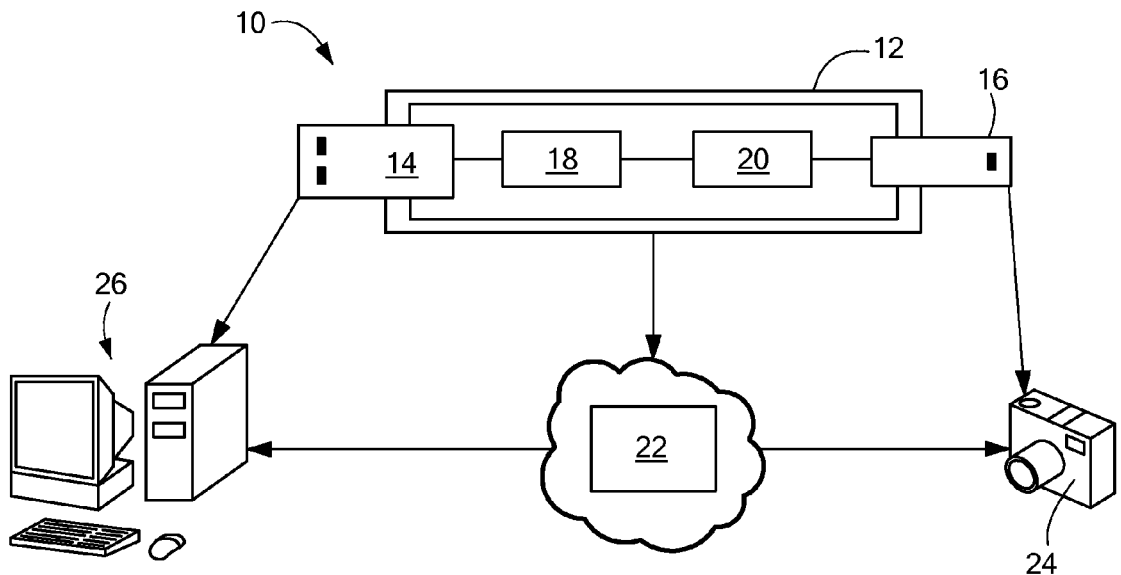
FIG. 3 is a functional diagram of an embodiment of an electronic storage device operable with one or more devices in accordance with the present invention.

As shown in FIG. 3, the electronic storage device 10 may further include an application, utility, or similar executable program 22 stored on the memory component of the device and operable through a digital camera 24 upon connection thereto, as well as additional electronic device 26 having a compatible connection or port, such as a laptop or personal computer. The application 22 may include the storage of drivers to enable compatibility of the application 22 with numerous makes and models of digital cameras, and may further enable the automatic recognition and initialization of a specific driver for a particular camera model. The application 22 may further enable a photographer or digital camera user to navigate a menu or series of operating options provided by the application 22 to transfer, store, and/or otherwise manipulate data and digital images on the camera. Navigation of the available menu options of the application 22 may be facilitated by a user input mechanism on the camera 24 itself, i.e., one or more buttons on the camera, a touchscreen, or the like.

In an exemplary method of use of the application 22 of the electronic storage device 10, the first connector 14 of the device may be engaged with a compatible complementary connector on a digital camera 24. For example, a male mini or micro USB connector on the storage device 10 may be coupled to a female mini or micro USB connector on the camera 24. Once the storage device 10 and the camera 24 are placed in electrical communication with one another via the paired connectors, power may be supplied to the storage device 10 by the camera 24 through the connection, and the storage device 10 may subsequently act or serve as a host having the stored information and/or menus for display and selection on a display component of the camera 24.

Figure 4:
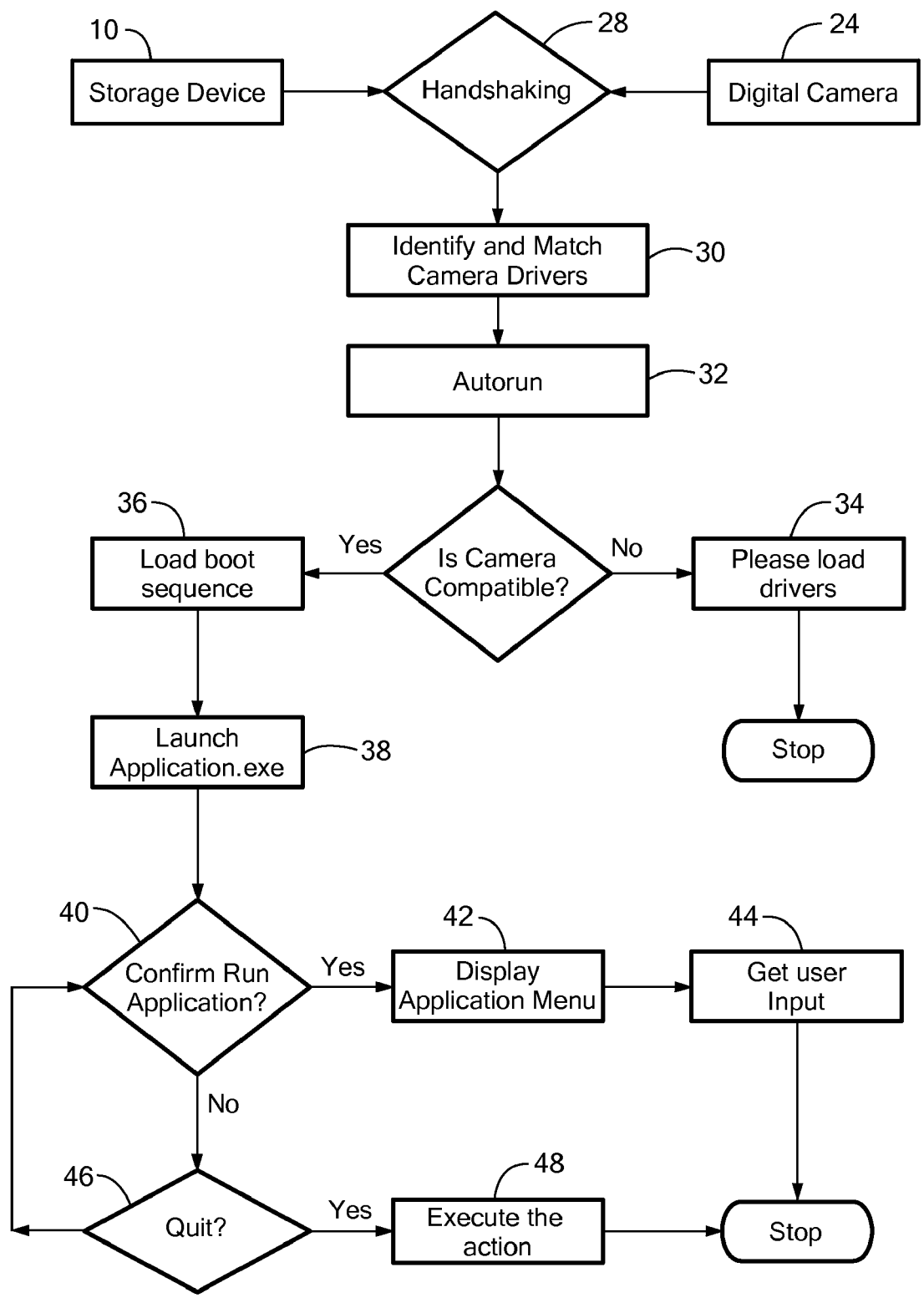
FIG. 4 is a flow chart showing an embodiment of a startup method of operation of an electronic storage device in accordance with the present invention.

Now referring to FIG. 4, once the electronic storage device 10 is engaged with the camera 24, a 'handshaking' process 28 may be initiated. In particular, the storage device 10 may search for a camera 24 driver stored within the memory component of the device that is compatible with the camera 24 being used. Once a compatible driver has been identified 30, a set of boot instructions correlating to the compatible driver will automatically load 32 for execution to run one or more components of the application 22. Should a compatible driver fail to be identified within the electronic storage device 10, updated or correct drivers will be required to be loaded 34 onto the electronic storage device 10 in order for it to operate with a particular camera 24 type or model. Upon identification and loading of the appropriate driver and boot sequence 36, the application 22 will be launched 38 and confirmation to run the application 22 may be requested 40 visually, tactically, and/or audibly through the camera 24, i.e., through the display on the camera 24. As stated above, navigation of the options and menus of the application 22 may be accomplished by one or more controls on the camera 24 itself, such as buttons, a touch-screen or the like. A 'yes' confirmation to run the application 22 may result in the display of the application 22 menu 42 for subsequent selection 44 by a user, while a 'no' selection may quit 46 the application 22 or result in a confirmation of the desire to exit or otherwise terminate 48 the application 22. The 'no' selection may further terminate the connection between the two devices, thereby allowing for the safe removal or disengagement of the storage device 10 from the camera 24. Should the 'no' selection not result in a confirmation to exit the application 22, the application 22 may restart automatically until a confirmation to either proceed with the application 22 or to exit the application 22 is indicated.

Figure 5:
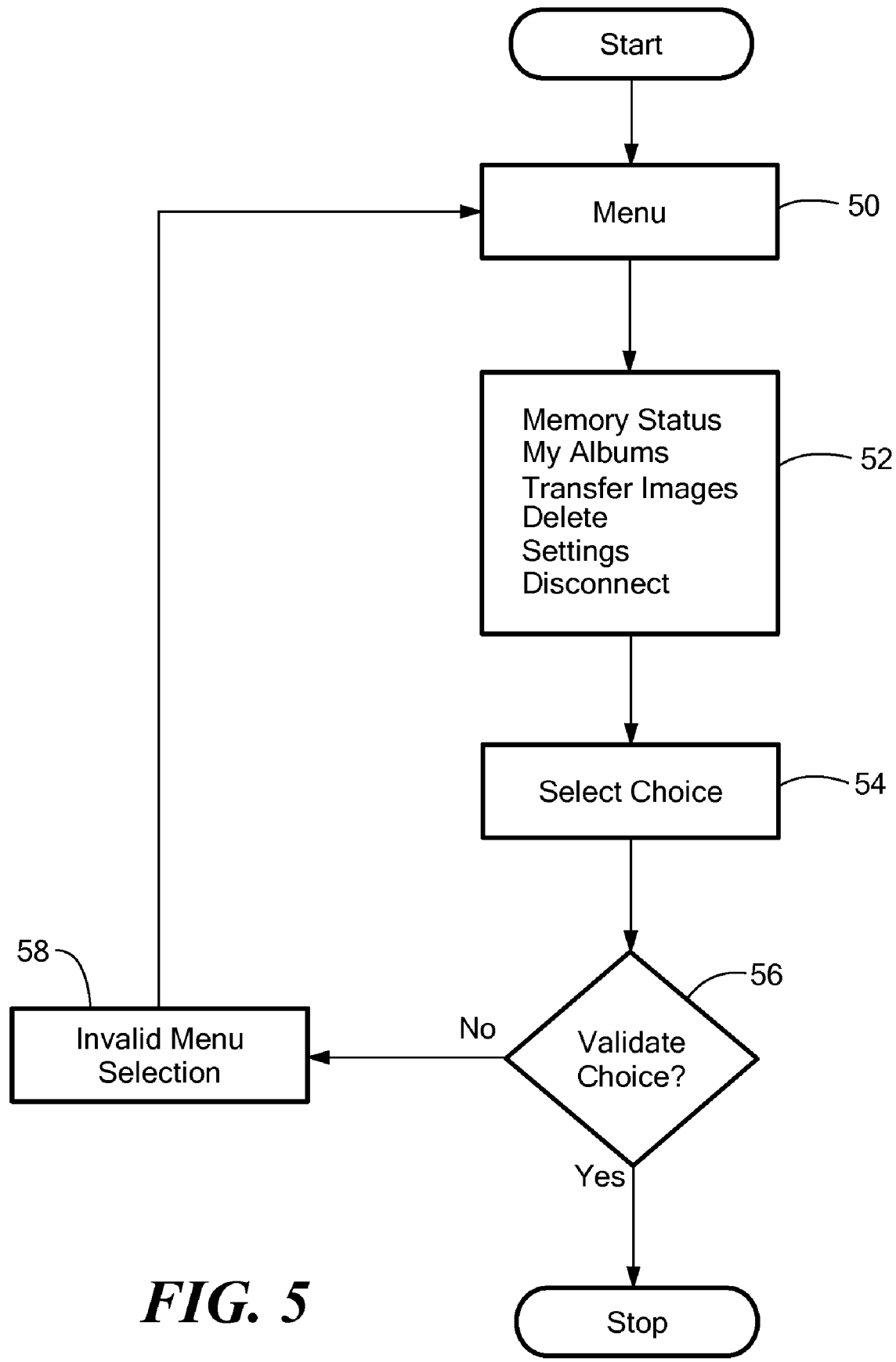
FIG. 5 is a flow chart showing an embodiment of a process of menu navigation of an electronic storage device in accordance with the present invention.

Upon receiving confirmation to proceed with the application 22, a menu 50 having one or more options for image storage, organization, and/or transfer 52 may be presented. Now referring to FIG. 5, for example, the menu may present options including 'Memory Status,' 'My Albums,' 'Transfer,' 'Delete,' 'Settings,' and/or 'Disconnect.' Options available form the menu may be selected through the camera 24, and upon selection 54 of a particular option, the application 22 may validate and/or otherwise confirm 56 a particular selection to proceed into one or more available sub-menus. If an invalid menu selection 58 is made, the application 22 may present the menu again, or provide an indication of an unavailable or invalid menu selection.

Figure 6:
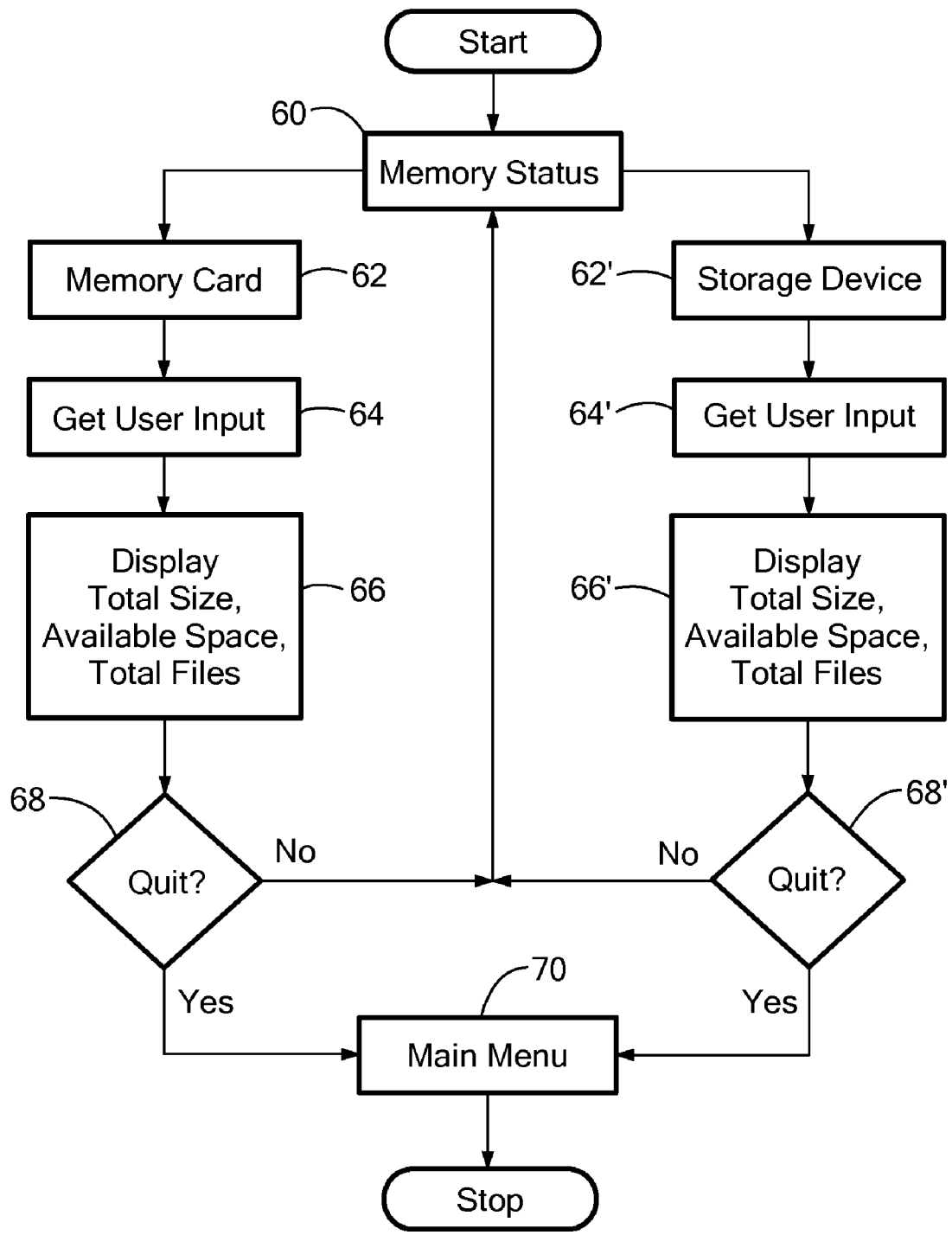
FIG. 6 is a flow chart showing an embodiment of a process of accessing memory of an electronic storage device in accordance with the present invention.

As shown in FIG. 6, selection of the 'Memory Status' option 60 may provide a submenu to allow access to the data and/or images stored on either and/or both of the memory component of the storage device 10 and the memory available on the camera 24. For example, the submenu may include a selection 62, 62' of either the storage device 10 or the camera 24 memory. Once a desired selection 64, 64' has been made, an additional submenu 66, 66' may provide options including 'Total size of memory' to identify or relate the total storage capacity of the selected media; 'Available Space' to identify storage capacity remaining; 'Used Space' to identify the storage capacity presently being used; and 'Number of Files' to identify how many files or images are presently stored. These options provide pertinent information regarding the usage and available capacity of the particular memory being employed. After viewing or navigating the one or more 'Memory Status' options, the application 22 may quit 68, 68' present the main menu 70 for further selection.

Figure 7:
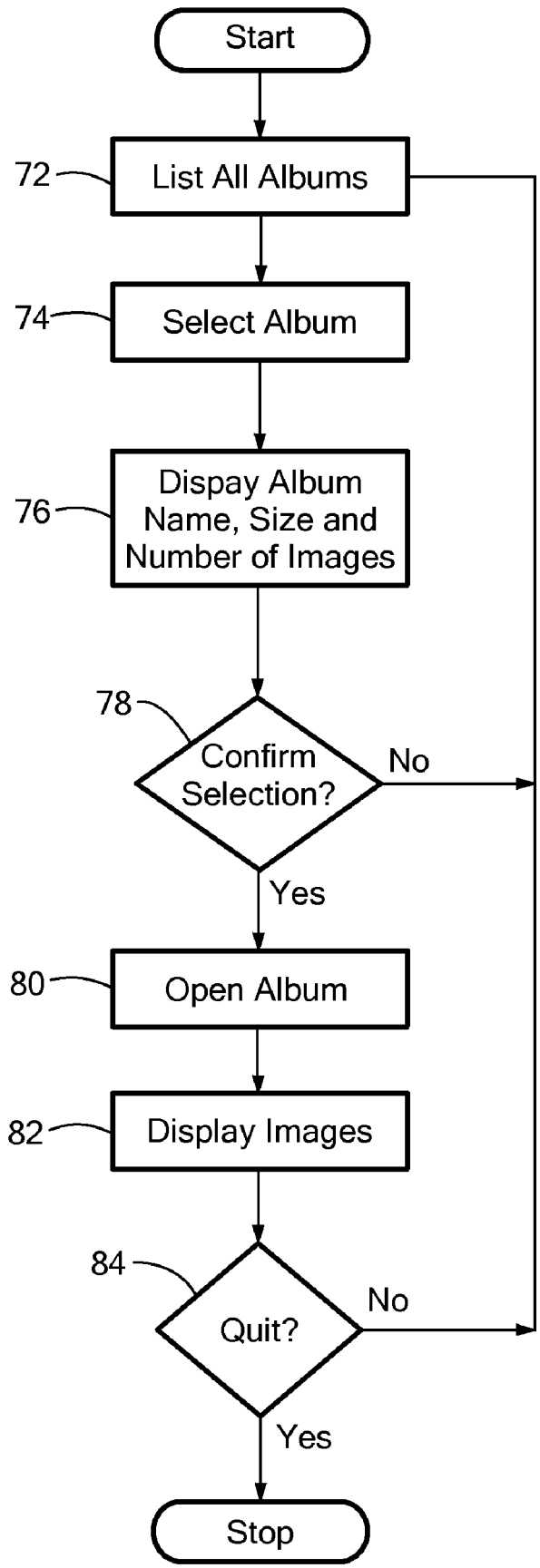
FIG. 7 is a flow chart showing an embodiment of a process for navigating content of an electronic storage device in accordance with the present invention.

Selection of the 'My Albums' option on the menu may provide one or more additional options on a submenu for viewing and/or organizing folders or albums stored on the storage device 10 that were previously transferred from the camera 24. Now referring to FIG. 7, for example, a submenu under the 'My Albums' option may include a list of folders or albums 72 having one or more images contained therein available for selection 74, and may further include information 76 related to the particular album or folder, including folder size, number of images, and the like. The folders or albums may be named automatically according to a default naming scheme, or may alternatively be assigned names by a user. Upon confirmation 78 of a selection of a desired album, the album may be opened 80 and the images contained in that folder or album may be browsed and/or displayed 82 on the display of the camera 24. A user may subsequently view additional albums or may quit 84 or return to a different menu or sub-menu.

Figure 8:
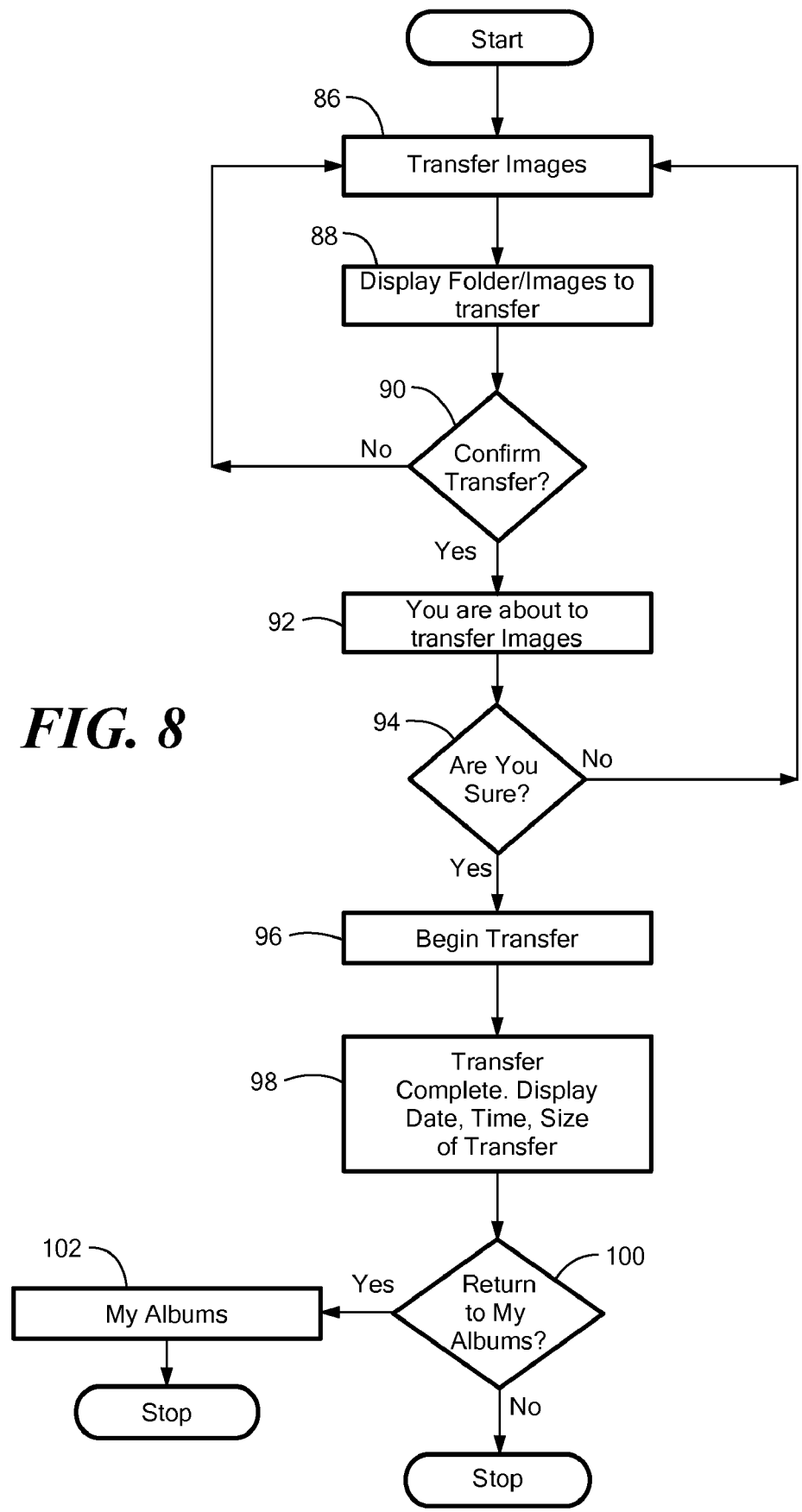
FIG. 8 is a flow chart showing an embodiment of a process for transferring data for an electronic storage device in accordance with the present invention.

As shown in FIG. 8, the 'Transfer' option of the menu allows for the transfer of data and/or images to and from the electronic storage device 10. In particular, selection of the 'Transfer' option 86 displays images 88 stored on the camera 24 or secondary device available for transfer. The desired images may be selected or highlighted for transfer using the inputs available on the camera 24 as discussed above. Once one or more images or data is selected, a confirmation 90 to transfer may be elicited form the user and a visible indication of the forthcoming process 92 may be displayed. Upon confirmation 94, the selected images or data will be electronically conveyed 96 to the memory component of the electronic storage device 10, and an indication 98 of the progression and/or completion of a successful transfer may be displayed on the camera 24, as well as the time, date, and/or size of the transferred files. The files transferred to the electronic storage device 10 may be labeled according to a default scheme, i.e., placed into folders entitled 'Album1,' 'Album2,' or the like. Once completed, an option to return to the available albums 100 may be selected 102, and/or the main menu may then be displayed for subsequent selection and navigation of desired options.

Figure 9:
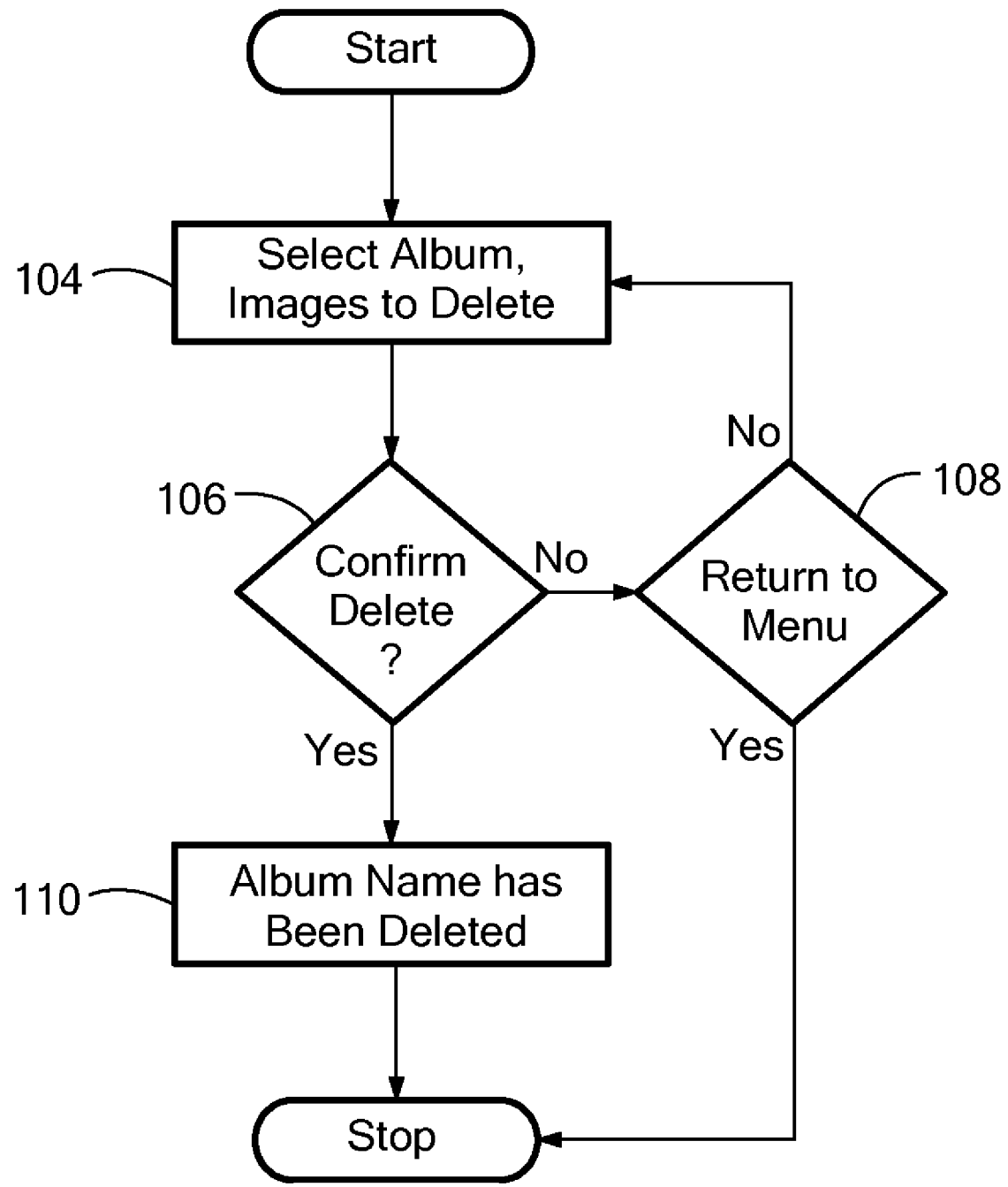
FIG. 9 is a flow chart showing an embodiment of a process for deleting data of an electronic storage device in accordance with the present invention.

Now referring to FIG. 9, the 'Delete' option on the menu may allow for the selection 104 and deletion of one or more images and/or data files from the electronic storage device 10. For example, a submenu correlating to the 'Delete' selection may list albums, which may be selected in their entirety or opened for the selection of one or more images therein. Once the desired data has been selected or highlighted for subsequent deletion, the application 22 may request confirmation 106 prior to execution of the 'Delete' command. If a confirmation is not given for the deletion, the application 22 may return to the main menu 108. Upon receiving confirmation to proceed with the deletion, a confirmation may be presented 110 on the display of the camera 24 that the deletion was successfully completed. Once completed, the menu and one or more submenus may be navigated and selected for further action.

Figure 10:
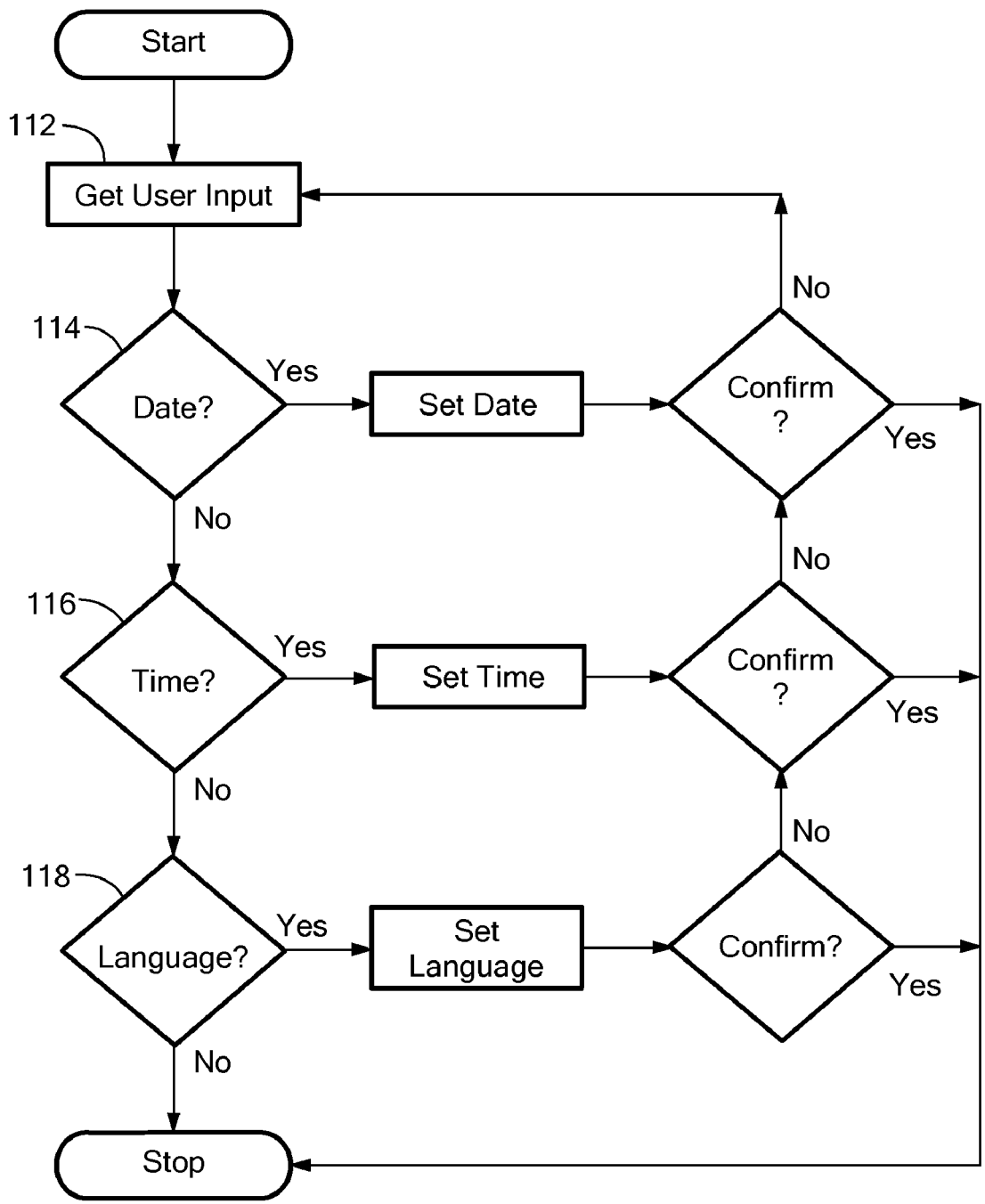
FIG. 10 is a flow chart showing an embodiment of a process for setting a date, time, and language of an electronic storage device in accordance with the present invention.

As shown in FIG. 10, the 'Settings' option on the menu of the application 22 may allow for the input 112 of information such as date, time, language, and the like. For example, once 'Settings' has been selected from the menu, a submenu may be presented including options for 'Set Date' 114 to identify the present date; 'Set Time' 116 to set the present time; and/or 'Set Language' 118 to identify the primary language in which the menu and other textual aspects of the application 22 may be preferably presented in. A confirmation of the selected entry for any one of the date, time and/or language may also be presented and/or provided to the user.

Figure 11:
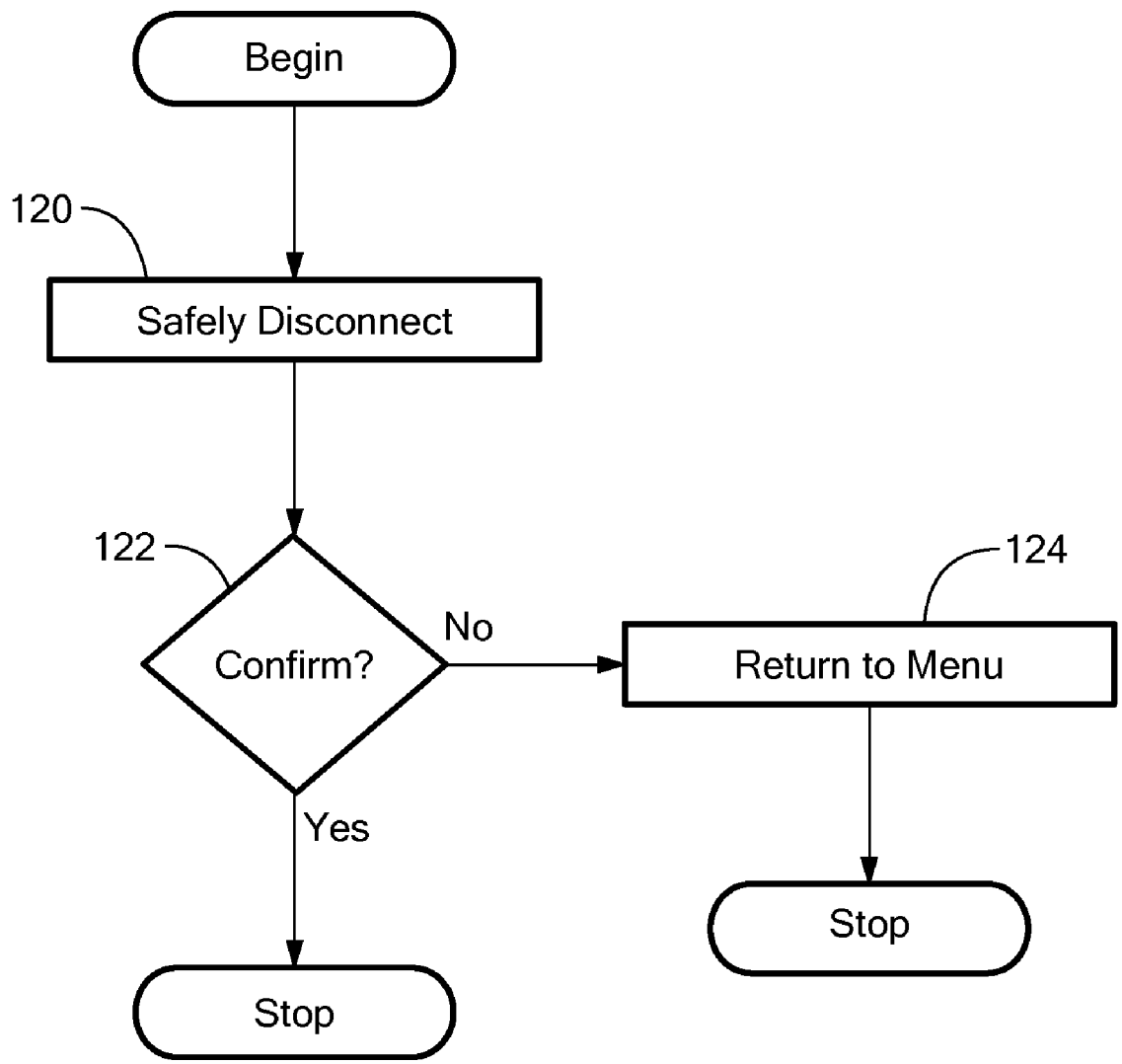
FIG. 11 is a flow chart showing an embodiment of a process for disconnecting an electronic storage device in accordance with the present invention.

The 'Disconnect' option on the menu of the application 22 provides for the safe and confirmed disconnection 120 of the electronic storage device 10 from the camera 24 or other secondary electronic device to avoid the loss or corruption of data either on the camera 24 or on the memory component of the storage device 10. In particular, as shown in FIG. 11, upon selection of the 'Disconnect' option on the menu, a confirmation 122 will be requested form the user via the display and controls on the camera 24. If no confirmation is provided. The application 22 may return 124 to the main menu. Upon confirmation of the desire to disconnect, the connection and/or power to the electronic storage device 10 may be terminated, thereby allowing for the safe disengagement of the storage device 10 from the camera 24.

In addition to operation in conjunction with a digital camera 24, the electronic storage device 10 may further be engaged with an additional or alternative electronic device via the second connector 16, such as the computer 26. For example, upon storing and/or manipulating data or images on the storage device 10, the second connector 16, which may include a male USB type-A or type-B connector among others, can be electrically coupled to a complementary female connector or port on a personal computer or a laptop. Once connected, the storage device 10 may allow for selection and navigation of the available options of the menus and submenus of the application 22 to be selected and operated through the computer or laptop to which the device is engaged as described above with respect to the camera 24. By including a plurality of connectors on the storage device 10, the storage device 10 is readily connectable to different ports or complementary connectors on various secondary devices, such as computers or laptops without the need for specialized adaptors or intermediate cords. As a result, simplified use of the storage device 10 may include engaging the second connector 16 with a digital camera 24 and navigating the options of the application 22 stored in the memory component of the electronic device to load or manipulate images, while at a later time, the device may be coupled to another device for further transfer of information or data through the first connector 14. Thus, the storage device 10 provides a convenient, portable, cost-effective apparatus that easily interfaces with a digital camera 24 for the transfer and storage of large amounts of data and/or digital images, thereby eliminating the need for immediate access to large, bulky devices such as a laptop or personal computer for an extended period of time. The electronic storage device 10 is also readily usable with a laptop or computer for the transfer of data and/or digital images from the storage device 10 without the need for specialized adapters, cords or the like.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A portable electronic storage device, comprising:
    a housing defining a first end and a second end;
    a first male connector, selected from one of a Universal Serial Bus type-A connector, a Universal Serial Bus type-B connector, a Universal Serial Bus mini-type connector or a Universal Serial Bus micro-type connector, fixed to the first end of the housing and engageable to a female connector of an electronic device, including a camera;
    a second male connector, selected from one of the Universal Serial Bus type-A connector, the Universal Serial Bus type-B connector, the Universal Serial Bus mini-type connector or the Universal Serial Bus micro-type connector, fixed to the second end of the housing and engageable to a complementary female connector or port of a secondary electronic device;
    an electronic memory component disposed within the housing;
    a controller disposed within the housing, wherein the controller is electrically coupled to the first connector, the second connector, and the electronic memory component; and
    a software program stored in the electronic memory component, the software program initiates handshaking and performs at least one of:
        1) organizing data stored on the memory component,
        2) transferring data from the electronic device to the electronic memory component,
        3) identifying at least one of a type, manufacturer, and model of the electronic device,
        4) deleting data stored on the electronic memory component,
        5) setting one or more settings for operating, including at least one of date, time, and language, and
        6) initiating the transfer of one or more images from the electronic device to the electronic memory component of the portable electronic storage device via an input mechanism located on the electronic device.

2. A software program stored on a portable electronic storage device that includes a housing defining a first end and a second end, a first male Universal Serial Bus connector fixed to the first end of the housing and engageable to a female connector of an electronic device, including a camera, a second male Universal Serial Bus connector fixed to the second end of the housing and engageable to a complementary female connector or port of a secondary electronic device, wherein either the first and second male connectors are selected from one of a Universal Serial Bus type-A connector, a Universal Serial Bus type-B connector, a Universal Serial Bus mini-type connector or a Universal Serial Bus micro-type connector, an electronic memory component disposed within the housing, and a controller disposed within the housing, wherein the controller is electrically coupled to the connectors and the electronic memory component, the software program being stored in the electronic memory component, the software program performing the steps of:
    initiating handshaking; and
    initiating at least one of:
        1) organizing data stored on the electronic memory component,
        2) identifying at least one of a type, manufacturer, and model of the electronic device,
        3) deleting data stored on the electronic memory component,
        4) setting one or more settings for operation, including at least one of data, time, and language, and
        5) transferring one or more images from the electronic device to the electronic memory component of the portable electronic storage device via an input mechanism located on the electronic device.

3. A method for transferring data, comprising the steps of:
    providing an electronic device, including a camera, having a visual display, an input mechanism and one or more images stored on an electronic storage media therein;
    electrically coupling a portable electronic storage device to the electronic device, wherein the portable electronic storage device includes a housing defining a first end and a second end; a first male Universal Serial Bus connector fixed to the first end of the housing and engageable to a female connector of the electronic device, a second male Universal Serial Bus connector fixed to the second end of the housing and coupled to a complementary female connector or port of a secondary electronic device, wherein either the first and second male connectors are selected from one of a Universal Serial Bus type-A connector, a Universal Serial Bus type-B connector, a Universal Serial Bus mini-type connector or a Universal Serial Bus micro-type connector, and a controller in communication with an electronic memory component and the first and second connectors within the housing for transferring one or more images, the electronic memory component having a computer software program stored therein; and operating the software program via the input mechanism of the electronic device to transfer one or more images from the electronic storage media to the electronic memory component of the portable electronic storage device, wherein the software program initiates handshaking and performs at least one of:

1) organizing data stored on the electronic memory component, 2) identify at least one of a type, manufacturer, and model of the electronic device, 3) deleting data stored on the electronic memory component, 4) setting one or more settings for operation, including at least one of data, time, and language, and 5) transferring one or more images from the electronic device to the electronic memory component of the portable electronic storage device via an input mechanism located on the electronic device.

4. The method according to claim 3, further comprising the step of electrically coupling the portable electronic storage device to a secondary electronic device, and transferring one or more images stored on the electronic memory component to the secondary electronic device.

* * * * *